United States Patent
Miller et al.

(10) Patent No.: US 10,094,668 B2
(45) Date of Patent: Oct. 9, 2018

(54) SYSTEMS AND METHODS FOR PRODUCING TWO INDEPENDENT DISSIMILAR ATTITUDE SOLUTIONS, TWO INDEPENDENT DISSIMILAR INERTIAL SOLUTIONS OR BOTH FROM ONE IMPROVED NAVIGATION DEVICE

(71) Applicant: Honeywell International Inc., Morristown, NJ (US)

(72) Inventors: Michael G. Miller, Andover, MN (US); Adam Ross Horner, Elk River, MN (US)

(73) Assignee: Honeywell International Inc., Morris Plains, NJ (US)

( * ) Notice: Subject to any disclaimer, the term of this patent is extended or adjusted under 35 U.S.C. 154(b) by 769 days.

(21) Appl. No.: 14/560,319

(22) Filed: Dec. 4, 2014

(65) Prior Publication Data
US 2016/0273919 A1   Sep. 22, 2016

Related U.S. Application Data

(60) Provisional application No. 62/061,787, filed on Oct. 9, 2014.

(51) Int. Cl.
*G01C 21/00* (2006.01)
*G01C 21/16* (2006.01)
(Continued)

(52) U.S. Cl.
CPC ............ *G01C 21/16* (2013.01); *G01C 21/165* (2013.01); *G01C 23/00* (2013.01); *G01S 19/53* (2013.01)

(58) Field of Classification Search
CPC combination set(s) only.
See application file for complete search history.

(56) References Cited

U.S. PATENT DOCUMENTS

| 3,505,641 A | 4/1970 | Boskovich |
| 4,914,598 A | 4/1990 | Krogmann et al. |

(Continued)

FOREIGN PATENT DOCUMENTS

| EP | 2685214 | 4/2013 |
| WO | 2009130576 | 10/2009 |

OTHER PUBLICATIONS

European Patent Office, "Extended European Search Report from European application No. 15189664.4", "from foreign counterpart of U.S. Appl. No. 14/575,762", dated Mar. 15, 2016, pp. 1-7, Published in: EP.

(Continued)

*Primary Examiner* — Hussein A. Elchanti
(74) *Attorney, Agent, or Firm* — Fogg & Powers LLC

(57) ABSTRACT

Systems and methods for producing two independent dissimilar attitude solutions, two independent dissimilar inertial solutions or both from one improved navigation device are disclosed. In one embodiment, an avionics system comprises: an inertial navigation device configured to produce a first set of attitude solutions; an attitude heading and reference unit configured to produce a primary set of attitude solutions and a secondary set of attitude solutions; and a display device configured to receive the first set of attitude solutions, the primary set of attitude solutions and the secondary set of attitude solutions, wherein if the first set of attitude solutions and the primary set of attitude solutions are yielding different results, then the display device is configured to determine whether the first set of attitude solutions or the primary set of attitude solutions is correct by determining differences between the attitude solutions and determining which difference is below a threshold.

20 Claims, 2 Drawing Sheets

Figure 1:
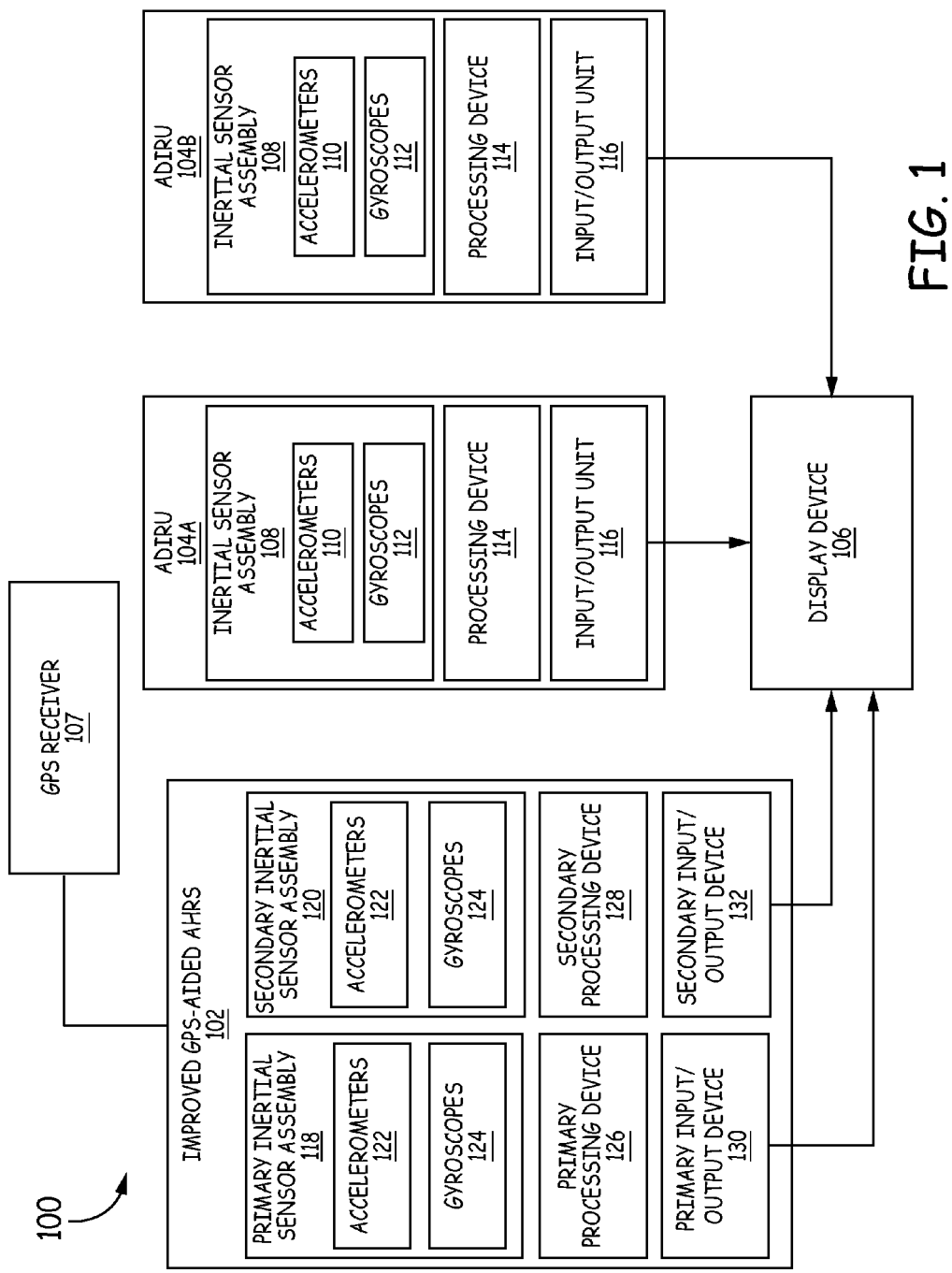

(51) Int. Cl.
*G01C 23/00* (2006.01)
*G01S 19/53* (2010.01)

(56) References Cited

U.S. PATENT DOCUMENTS

| | | | |
|---|---|---|---|
| 6,266,582 | B1 | 7/2001 | Bruckner |
| 6,285,298 | B1* | 9/2001 | Gordon ............... G05B 9/03 340/945 |
| 6,341,248 | B1* | 1/2002 | Johnson ............ G05D 1/0833 244/1 R |
| 6,405,107 | B1* | 6/2002 | Derman .............. G05D 25/02 700/12 |
| 6,654,685 | B2 | 11/2003 | McIntyre |
| 6,907,332 | B1 | 6/2005 | Huynh et al. |
| 6,940,427 | B2* | 9/2005 | Bateman ............. B64D 43/02 340/948 |
| 7,107,833 | B2 | 9/2006 | Osborne |
| 8,082,099 | B2 | 12/2011 | Latif |
| 8,204,635 | B2 | 6/2012 | Manfred et al. |
| 8,412,389 | B2 | 4/2013 | Tessier |
| 8,441,396 | B2 | 5/2013 | Parmet et al. |
| 8,538,607 | B2 | 9/2013 | Manfred et al. |
| 8,665,120 | B2 | 3/2014 | Thoreen |
| 9,037,318 | B2 | 5/2015 | Manfred et al. |
| 9,261,883 | B2* | 2/2016 | Ishihara .............. G01C 23/00 |
| 2002/0079403 | A1* | 6/2002 | Boe .................. B64D 45/0005 244/1 R |
| 2010/0152929 | A1 | 6/2010 | Manfred et al. |
| 2011/0172855 | A1* | 7/2011 | Marstall ............ G05D 1/0808 701/9 |
| 2011/0184594 | A1 | 7/2011 | Manfred et al. |
| 2011/0205090 | A1* | 8/2011 | Marstall ............ G01C 23/005 340/975 |
| 2013/0238172 | A1 | 9/2013 | Manfred et al. |
| 2015/0308832 | A1 | 10/2015 | Coatantiec |
| 2016/0107761 | A1 | 4/2016 | Ahlbrecht et al. |

OTHER PUBLICATIONS

European Patent Office, "Extended European Search Report from EP Application No. 15188385.7 dated Feb. 17, 2016", "from Foreign Counterpart of U.S. Appl. No. 14/575,762", dated Feb. 17, 2016, pp. 1-14, Published in: EP.
U.S. "Office Action", "From U.S. Appl. No. 14/575,762", dated Feb. 19, 2016, pp. 1-24, Published in: US.
U.S. "Notice of Allowance", "U.S. Appl. No. 14/575,762", dated Jul. 8, 2016, pp. 1-12, Published in: US.
Carminati, "Fault detection and isolation enhancement of an aircraft attitude and heading reference system based on MEMS inertial sensors", "Procedia Chemistry", Aug. 31, 2009, pp. 509-512, Publisher: Elsevier B.V.
Kim et al., "FDI for Inertial Sensor Using Single Antenna GPS Receiver", "16th IFAC Symposium on Automatic Control in Aerospace (IFAC AVA 2004)", Jun. 2004, pp. 1-6, Publisher: Seoul National University.
European Patent Office, "Communication pursuant to Article 94(3) EPC", dated Jul. 4, 2016, pp. 1-12, Published in: EP.
Ahlbrecht et al., "System and Method for Isolating Attitude Failures in Aircraft", "U.S. Appl. No. 14/575,762, filed Dec. 18, 2014", Dec. 18, 2014, pp. 1-28.
U.S. "Office Action", "from U.S. Appl. No. 14/575,762", dated Nov. 1, 2016, pp. 1-17, Published in: US.
European Patent Office, "Communication Pursuant to Article 94(3) for EP Application No. 15188385.7", "Foreign Counterpart to U.S. Appl. No. 14/560,319", dated Apr. 12, 2017, pp. 1-11, Published in: EP.

* cited by examiner

SYSTEMS AND METHODS FOR PRODUCING TWO INDEPENDENT DISSIMILAR ATTITUDE SOLUTIONS, TWO INDEPENDENT DISSIMILAR INERTIAL SOLUTIONS OR BOTH FROM ONE IMPROVED NAVIGATION DEVICE

CROSS-REFERENCE TO RELATED APPLICATIONS

This application claims priority to, and the benefit of, U.S. Provisional Patent Application No. 62/061,787, entitled "SYSTEMS AND METHODS FOR PRODUCING TWO INDEPENDENT DISSIMILAR ATTITUDE SOLUTIONS, TWO INDEPENDENT DISSIMILAR INERTIAL SOLUTIONS OR BOTH FROM ONE IMPROVED NAVIGATION DEVICE" which was filed on Oct. 9, 2014 and which is hereby incorporated by reference in its entirety.

BACKGROUND

Aircraft utilize navigation devices that provide attitude solutions (e.g., pitch, roll and heading information) along with inertial solutions (e.g., accelerations and angular body rates, which velocity can be determined therefrom) to various displays and systems of the aircraft. Some of these navigation devices are redundant to provide a measure of safety in case of equipment failure and provide for confirmation of correct readings. Dispatch of aircraft also is sometimes dependent upon the availability of redundant navigation devices that provide attitude and inertial solutions. Conventional implementations use multiple devices to provide the redundant measurements.

In many conventional implementations, three Air Data Inertial Reference Units (ADIRUs) are used to provide the redundant measurements. However, there is a desire to replace one of the ADIRUs with a different type of navigation unit, such as a Global Positioning System (GPS)-aided Attitude Heading Reference System (AHRS). While making this transition, there is also a desire to be able to dispatch if one of the ADIRUs fails. However, if the remaining ADIRU and GPS-aided AHRS calculate two independent dissimilar attitude solutions, two independent dissimilar inertial solutions or both, it cannot be determined whether the remaining ADIRU or the GPS-aided AHRS is calculating the erroneous attitude solution.

For the reasons stated above and for the reasons stated below which will become apparent to those skilled in the art upon reading and understanding the specification, there is a need in the art for improved systems and methods for determining an erroneous attitude error in a system that utilizes a combination of different types of navigation units.

SUMMARY

The Embodiments of the present disclosure provide systems and methods for producing two independent dissimilar attitude solutions, two independent dissimilar inertial solutions or both from one improved navigation device.

In one embodiment, an avionics system comprises: an inertial navigation device configured to produce a first set of attitude solutions; an attitude heading and reference unit configured to produce a primary set of attitude solutions and a secondary set of attitude solutions; and a display device configured to receive the first set of attitude solutions, the primary set of attitude solutions and the secondary set of attitude solutions, wherein if the difference between the first set of attitude solutions and the primary set of attitude solutions is greater than a threshold, then the display device is configured to determine whether the first set of attitude solutions or the primary set of attitude solutions is correct by determining whether the difference between the first set of attitude solutions and the secondary set of attitude solutions is less than a threshold or whether the difference between the primary set of attitude solutions and the secondary set of attitude solutions is less than a threshold.

DRAWINGS

Figure 2:
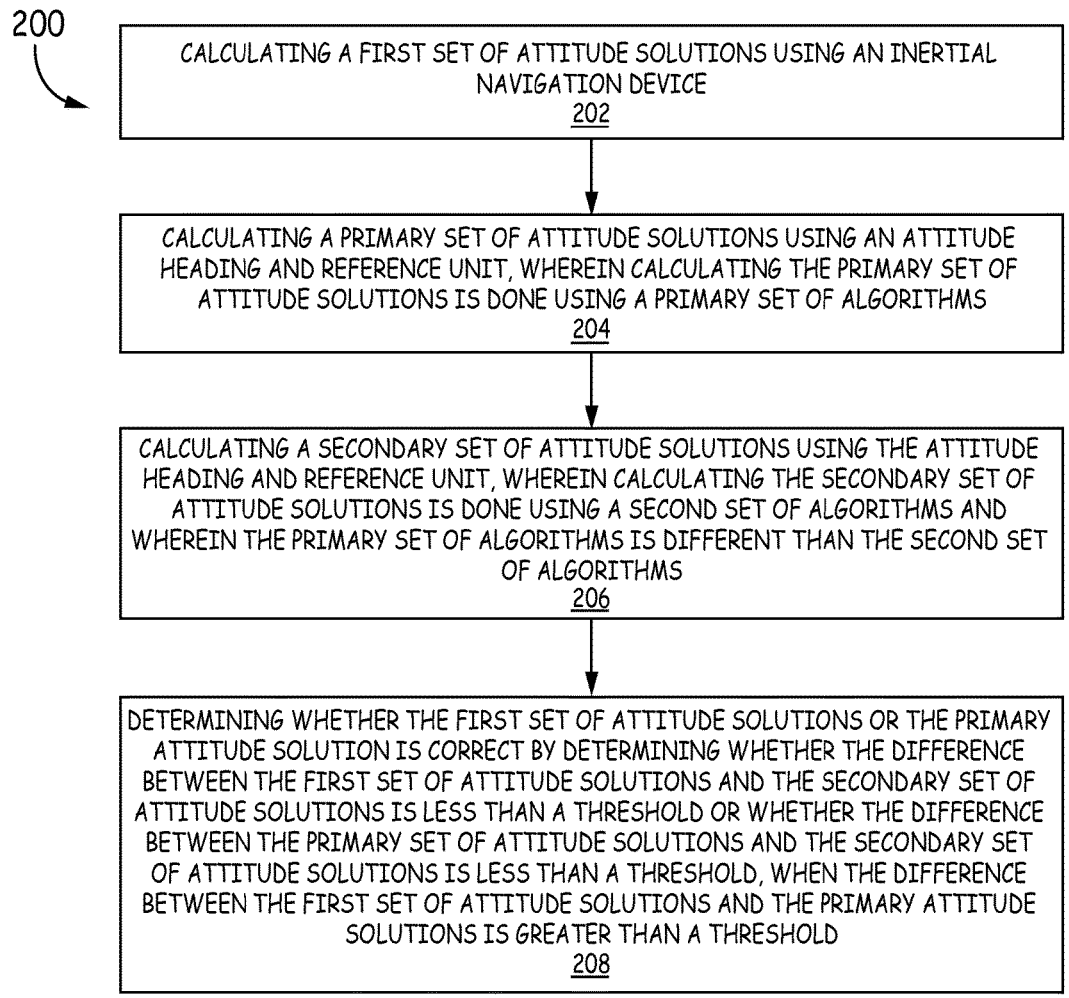

Understanding that the drawings depict only exemplary embodiments and are not therefore to be considered limiting in scope, the exemplary embodiments will be described with additional specificity and detail through the use of the accompanying drawings, in which:

FIG. 1 is block diagram of an example avionics system that includes an Improved GPS-aided AHRS, which provides two independent dissimilar attitude solutions, two independent dissimilar inertial solutions or both; and FIG. 2 is an example method for producing two independent dissimilar attitude solutions, two independent dissimilar inertial solutions or both from one improved navigation device.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments provided herein can detect an erroneous attitude error in a navigation system that utilizes a combination of different types of navigation units, where one of the first navigation units has failed. As explained above, there is a desire to only use two ADIRUs and one GPS-aided AHRS on an aircraft. Under this scenario, if one of the ADIRU fails and the remaining ADIRU and GPS-aided AHRS do not yield the same attitude solution, one cannot determine which attitude solution is correct. The embodiments described herein provide a solution to this problem. Specifically, the GPS-aided AHRS is replaced with an improved GPS-aided AHRS that calculates an additional set of dissimilar attitude parameters. These additional dissimilar attitude parameters can determine which of the two solutions is incorrect.

FIG. 1 is a block diagram of an example avionics system 100 that includes an Improved GPS-aided AHRS 102, which provides two independent dissimilar attitude solutions, two independent dissimilar inertial solutions or both. The system 100 also includes two ADIRUs 104A, 104B, a display device 106 and a GPS receiver 107. While three navigation units 102, 104A, 104B are shown, more or less navigation units may be included on an aircraft, depending on the aircraft. Furthermore, different types of navigation devices may be included in the system as long as at least one Improved GPS-aided AHRS 102 is included in the system 100.

As is shown in FIG. 1, the ADIRUs 104A, 104B include an inertial sensor assembly 108. An inertial sensor assembly 108 includes accelerometers 110 and gyroscopes 112. In some embodiments, there are three gyroscopes 112 and three accelerometers 110 included in each inertial sensor assembly 108. However, more or less gyroscopes 112 and accelerometers 110 may be included in the inertial sensor assembly 108. The ADIRUs 104A, 104B also include a processing device 114 configured to receive inertial data from the inertial sensor assembly 108 and provide attitude and inertial solutions based on the received inertial data. Furthermore, the ADIRUs 104A, 104B include an input/output (I/O) unit 116 communicatively coupled to the processing device 114. The I/O device 116 receives the attitude and inertial solutions computed by the processing device 114 and outputs the attitude and inertial solutions to other systems within the aircraft, such as the display device 106.

As is shown in FIG. 1, the Improved GPS-Aided AHRS 102 is aided by a GPS receiver 107 and includes a primary inertial sensor assembly 118 and a secondary inertial sensor assembly 120. In conventional implementations, a GPS-Aided AHRS only includes one inertial sensor assembly due to cost and other constraints. AHRS 102, as known to one having skill in the art, come in different form factors, including a 4 MCU form factor, which measures 7.64 inches in height, 12.76 inches in length, and 4.88 inches in width. The embodiments described herein can be included in this 4 MCU AHRS 102 form factor, among other form factors.

Similar to the inertial sensor assemblies 108 in the ADIRUs 104A, 104B, the primary and secondary inertial sensor assemblies 118, 120 include accelerometers 122 and gyroscopes 124. Moreover, and similar to above, in some embodiments, three accelerometers 122 and three gyroscopes 124 may be included in each inertial sensor assembly 118, 120, respectively. However, in some embodiments, the number and type of gyroscopes 112, 124 and accelerometers 110, 122 may be different in each inertial sensor assembly 108, 118, 120. For example, in some embodiments, the inertial sensor assembly 108 may include ring laser gyroscopes 112 and the inertial sensor assemblies 118, 120 may include Micro Electro-Mechanical Systems (MEMS) gyroscopes or fiber optic gyroscopes 124. In other embodiments, the accelerometers 122, and gyroscopes 124 in inertial sensor assembly 118 may be different than the accelerometers 122 and gyroscopes 124 included in inertial sensor assembly 120. However, these are only examples and not meant to be limiting.

The Improved GPS-Aided AHRS 102 also includes dedicated processing devices 126, 128 for each inertial sensor assembly 118, 120, respectively. That is, the primary processing device 126 is configured to receive inertial data from the primary inertial sensor assembly 118 and provide attitude and inertial solutions based on the received inertial data; and, the secondary processing device 128 is configured to receive inertial data from the secondary inertial sensor assembly 120 and provide attitude and/or inertial solutions based on the received inertial data. In addition to each inertial sensor assembly 118, 120 having a dedicated processing device 126, 128, in exemplary embodiments, the software that is executed by each of the respective processing devices 126, 128 is dissimilar. The reason for dedicated processing devices 126, 128 and dissimilar software running on each processing device 126, 128 is to prevent a common-mode failure. As a result, any generic defect in the processing devices 126, 128 and/or software executed by the processing devices 126, 128 would not affect both inertial sensor assemblies 118, 120. This is contrary to conventional implementations where a conventional GPS-Aided AHRS only includes one processing device due to cost and other constraints.

In some embodiments, the secondary processing device 128 can calculate a subset of the attitude and inertial solutions that the primary processing device 126 calculates. For example, in some embodiments, the secondary processing device 128 dedicated to the secondary inertial sensor assembly 120 may only calculate attitude solutions, whereas the primary processing device 126 calculates attitude and inertial solutions.

Each inertial sensor assembly 118, 120 also includes a separate I/O device 130, 132. That is, the primary I/O device 130 receives the inertial solutions from the primary processing device 126 and outputs the attitude and inertial solutions to other systems within the aircraft, such as the display device 106; and, the secondary I/O device 132 receives the inertial solutions from the secondary processing device 128 and outputs the attitude and/or inertial solutions to other systems within the aircraft, such as the display device 106.

For aircrafts that include an Improved GPS-Aided AHRS 102 in their navigation system 100, it is possible for the aircraft to take-off with one failed ADIRU 104A, 104B. Specifically, due to the implementations disclosed herein, it is possible for the aircraft to take-off with one failed ADIRU 104A, 104B since there is a third navigation solution produced by either the primary inertial assembly 118 or the secondary inertial sensor assembly 120 that functions as a tie-breaker. For example, assume ADIRU 104A has failed and the remaining ADIRU 104B and the primary inertial assembly 118 are producing dissimilar results. The secondary inertial sensor assembly 120, since it is producing an additional navigation solution, can be used by the display device 106 to determine which of the two attitude solutions and/or two attitude inertial solutions produced by the functioning ADIRU 104B and the primary inertial sensor assembly 118 is the correct attitude solution. Stated another way, there are three attitude solutions and/or three inertial solutions, two produced by the Improved GPS-Aided AHRS 102 and one produced by the functioning ADIRU 104B. If the attitude solution produced by the primary inertial sensor assembly 118 and processor 126 are different than the attitude solution produced by the functioning ADIRU 104B by a certain threshold (e.g., by more than 2%), the attitude solution produced by the secondary inertial sensor assembly 120 and processor 128 can be used by the display device 106 as a discriminator to determine which device is producing the correct attitude solution. This can be done by determining whether the difference between the set of attitude and/or inertial solutions produced by the processing device 114 included in the functioning ADIRU 104B and the attitude and/or inertial solutions produced by the secondary processing device 128 is less than a threshold (e.g., 2%) or whether the difference between the set of attitude and/or inertial solutions produced by the primary processing device 126 and the set of attitude and/or inertial solutions produced by the secondary processing device 128 is less than the threshold (e.g., 2%). As a result, an aircraft with one failed ADIRU 104A, 104B can still take off.

FIG. 2 is an example method 200 for determining which of two dissimilar attitude solutions is correct. The method 200 comprises calculating a first set of attitude solutions using a navigation device (block 202). The first set of attitude solutions can be produced by an ADIRU or other navigation device, similar to the ADIRUs 104A, 104B discussed above, and can include pitch, roll and/or heading.

The method 200 further comprises calculating a primary set of attitude solutions using an improved attitude heading and reference unit, wherein calculating the primary set of attitude solutions is done using a primary set of algorithms (block 204). The primary set of attitude and inertial solutions can be calculated using a primary inertial sensor assembly included in the improved navigation device. In some embodiments, the primary inertial sensor assembly can have some or all of the same characteristics as the primary inertial sensor assembly 118 discussed above. Moreover, in exemplary embodiments, a first processor can be used to calculate the first set of attitude and inertial solutions. In some embodiments, the first processor can have some or all of the same characteristics as the processing device 126 discussed above.

The method 200 further comprises calculating a secondary set of attitude solutions using the improved attitude heading and reference unit, wherein calculating the secondary set of attitude solutions is done using a second set of algorithms, wherein the primary set of algorithms is different than the second set of algorithms (block 206). The secondary set of attitude solutions are calculated from secondary inertial data. In some embodiments, a secondary set of inertial solutions can be calculated in addition to the secondary set of attitude solutions. Similar to above, the secondary attitude and inertial data can be produced by a secondary inertial sensor assembly included in the improved navigation device. In some embodiments, the secondary inertial sensor assembly can have some or all of the same characteristics as the secondary inertial sensor assembly 120 discussed above. Moreover, in exemplary embodiments, a second processor can be used to calculate the second set of attitude solutions and inertial solutions. In some embodiments, the second processor can have some or all of the same characteristics as the processing device 128 discussed above.

The method 200 further comprises determining whether the first set of attitude solutions or the primary set of attitude solutions is correct by determining whether the difference between the first set of attitude solutions and the secondary set of attitude solutions is less than a threshold (e.g., 2%) or whether the difference between the primary set of attitude solutions and the secondary set of attitude solutions is less than a threshold (e.g., 2%), when the difference between the first set of attitude solutions and the primary attitude solutions is greater than a threshold (e.g., 2%) (block 208). In some embodiments, this can be done by a display device, similar to the display device 106 discussed above. In some embodiments, an alert can be displayed on a display device when the difference between the first set of attitude solutions differs from the primary set of attitude solutions by a threshold. For example, if the calculated pitch in the first set of attitude solutions differs from the calculated pitch in the primary set of attitude solutions by more than 2%, then an alert can be triggered that this block should be performed. However, this is only an example and not meant to be limiting.

In some embodiments, the method 200 can further comprise outputting on a first bus the primary set of attitude and inertial solutions to a display device. In some embodiments, the bus can have some or all of the same characteristics as the I/O device 130 discussed above. Moreover, in some embodiments, the method 200 can further comprise outputting on a second bus the secondary set of attitude solutions.

In some embodiments, the bus can have some or all of the same characteristics as the I/O device 132 discussed above.

The memory used in the present systems and methods can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

A processing device used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device can also include functions with software programs, firmware, or other computer readable instructions for carrying out various process tasks, calculations, and control functions used in the present method and system.

One or more actions described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

EXAMPLE EMBODIMENTS

Example 1 includes an avionics system comprising: an inertial navigation device configured to produce a first set of attitude solutions; an attitude heading and reference unit configured to produce a primary set of attitude solutions and a secondary set of attitude solutions; and a display device configured to receive the first set of attitude solutions, the primary set of attitude solutions and the secondary set of attitude solutions, wherein if the difference between the first set of attitude solutions and the primary set of attitude solutions is greater than a threshold, then the display device is configured to determine whether the first set of attitude solutions or the primary set of attitude solutions is correct by determining whether the difference between the first set of attitude solutions and the secondary set of attitude solutions is less than a threshold or whether the difference between the primary set of attitude solutions and the secondary set of attitude solutions is less than a threshold.

Example 2 includes the avionics system of Example 1, wherein the attitude heading and reference unit comprises: a primary inertial sensor assembly configured to produce primary inertial data; a primary processing device communicatively coupled to the primary inertial sensor assembly, wherein the primary processing device is configured to receive the primary inertial data and calculate the primary set of attitude solutions from the primary inertial data; a secondary inertial sensor assembly configured to produce secondary inertial data; and a secondary processing device communicatively coupled to the secondary inertial sensor assembly, wherein the secondary processing device is configured to receive the secondary inertial data and calculate the secondary set of attitude solutions.

Example 3 includes the avionics system of Example 2, wherein the improved attitude heading and reference unit further comprises: a primary input-output unit communicatively coupled to the primary processing device, wherein the primary input-output unit is configured to receive the primary set of attitude and inertial solutions from the primary processing device and output the primary set of attitude and inertial solutions to the display device; and a secondary input-output unit communicatively coupled to the secondary processing device, wherein the secondary input-output unit is configured to receive the secondary set of attitude solutions from the secondary processing device and output the secondary set of attitude solutions to the display device.

Example 4 includes the avionics system of any of Examples 2-3, wherein the primary processing device is a microprocessor and the secondary processing device is a field programmable gate array.

Example 5 includes the avionics system of any of Examples 2-4, wherein the primary processing device executes a primary set of algorithms to calculate the primary set of attitude solutions and the secondary processing device executes a second set of algorithms to calculate the secondary set of attitude solutions, wherein the primary set of algorithms is different than the second set of algorithms.

Example 6 includes the avionics system of any of Examples 2-5, wherein the primary inertial assembly includes three primary gyroscopes and three primary accelerometers and wherein the secondary inertial sensor includes three secondary gyroscopes and three secondary accelerometers, wherein the three primary gyroscopes are different than the three secondary gyroscopes and wherein the three primary accelerometers are different than the three secondary accelerometers.

Example 7 includes the avionics system of any of Examples 1-6, wherein the first set of attitude solutions, the primary set of attitude solutions and the secondary set of attitude solutions is at least one of the following: pitch, roll or heading.

Example 8 includes the avionics system of any of Examples 1-7, wherein the attitude heading and reference unit is configured to receive signals from a global navigation satellite receiver.

Example 9 includes the avionics system of any of Examples 1-8, wherein the display device displays an alert when the difference between the first set of attitude solutions and the primary set of attitude solutions is above a threshold.

Example 10 includes an attitude heading and reference unit comprising: a primary inertial sensor assembly configured to produce primary inertial data; a primary processing device communicatively coupled to the primary inertial sensor assembly, wherein the primary processing device is configured to receive the primary inertial data and calculate a primary set of attitude solutions from the primary inertial data; a secondary inertial sensor assembly configured to produce secondary inertial data; a secondary processing device communicatively coupled to the secondary inertial sensor assembly, wherein the secondary processing device is configured to receive the secondary inertial data and calculate a secondary set of attitude solutions; and wherein if the difference between a first set of attitude solutions and the primary set of attitude solutions is greater than a threshold, then a display device is configured to determine whether the first set of attitude solutions or the primary set of attitude solutions is correct by determining whether the difference between the first set of attitude solutions and the secondary set of attitude solutions is less than a threshold or whether the difference between the primary set of attitude solutions and the secondary set of attitude solutions is less than a threshold.

Example 11 includes the improved attitude heading and reference unit of Example 10, further comprising: a primary input-output unit communicatively coupled to the primary processing device, wherein the primary input-output unit is configured to receive the primary set of attitude and inertial solutions from the primary processing device and output the primary set of attitude and inertial solutions to the display device; and a secondary input-output unit communicatively coupled to the secondary processing device, wherein the secondary input-output unit is configured to receive the secondary set of attitude solutions from the secondary processing device and output the secondary set of attitude solutions to the display device.

Example 12 includes the attitude heading and reference unit of any of Examples 10-11, wherein the primary processing device is a microprocessor and the secondary processing device is a field programmable gate array.

Example 13 includes the attitude heading and reference unit of any of Examples 10-12, wherein the primary processing device executes a primary set of algorithms to calculate the primary set of attitude solutions and the secondary processing device executes a second set of algorithms to calculate the second set of attitude solutions, wherein the primary set of algorithms is different than the second set of algorithms.

Example 14 includes the attitude heading and reference unit of any of Examples 10-13, wherein the first set of attitude solutions, the primary set of attitude solutions and the secondary set of attitude solutions is at least one of the following: pitch, roll or heading.

Example 15 includes the attitude heading and reference unit of any of Examples 10-14, wherein the attitude heading and reference unit is configured to receive signals from a global navigation satellite receiver.

Example 16 includes the attitude heading and reference unit of any of Examples 10-15, wherein the primary inertial assembly includes three primary gyroscopes and three primary accelerometers and wherein the secondary inertial sensor includes three secondary gyroscopes and three secondary accelerometers, wherein the three primary gyroscopes are different than the three secondary gyroscopes and wherein the three primary accelerometers are different than the three secondary accelerometers.

Example 17 includes the attitude heading and reference unit of any of Examples 10-16, wherein the display device displays an alert when the difference between the first set of attitude solutions and the primary set of attitude solutions is above a threshold.

Example 18 includes a method for determining which of two dissimilar attitude solutions is correct comprising: calculating a first set of attitude solutions using an inertial navigation device; calculating a primary set of attitude solutions using an attitude heading and reference unit, wherein calculating the primary set of attitude solutions is done using a primary set of algorithms; calculating a secondary set of attitude solutions using the attitude heading and reference unit, wherein calculating the secondary set of attitude solutions is done using a second set of algorithms and wherein the primary set of algorithms is different than the second set of algorithms; and determining whether the first set of attitude solutions or the primary attitude solution is correct by determining whether the difference between the first set of attitude solutions and the secondary set of attitude solutions is less than a threshold or whether the difference between the primary set of attitude solutions and the secondary set of attitude solutions is less than a threshold, when the difference between the first set of attitude solutions and the primary attitude solutions is greater than a threshold.

Example 19 includes the method of Example 18, further comprising generating an alert signal when the difference between the first set of attitude solutions and the primary set of attitude solutions is above a threshold.

Example 20 includes the method of any of Examples 18-19, wherein the first set of attitude solutions, the primary set of attitude solutions and the secondary set of attitude solutions is at least one of the following: pitch, roll or heading.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics system comprising:
   an inertial navigation device configured to produce a first set of attitude solutions;
   an attitude heading and reference unit comprising a primary inertial sensor assembly configured to produce primary inertial data and a secondary inertial sensor assembly configured to produce secondary inertial data, wherein the attitude heading and reference unit is configured with a primary processing device to produce a primary set of attitude solutions from the primary inertial data using a primary set of algorithms, and configured with a secondary processing device to produce a secondary set of attitude solutions from the secondary inertial data using a second set of algorithms, wherein the primary processing device and the secondary processing device are both included within a single modular unit, wherein the primary set of algorithms is different than the second set of algorithms and the secondary processing device calculates a subset of attitude and inertial solutions that the primary processing device calculates; and
   a display device configured to receive the first set of attitude solutions, the primary set of attitude solutions and the secondary set of attitude solutions,
      wherein, in response to a determination that the difference between the first set of attitude solutions and the primary set of attitude solutions is greater than a threshold, the display device is configured to determine whether the first set of attitude solutions or the primary set of attitude solutions is correct by determining whether a difference between a first attitude solution from the first set of attitude solutions and a discriminator attitude solution obtained from the secondary set of attitude solutions is less than a threshold or whether the difference between the primary set of attitude solutions and the discriminator attitude solutions is less than a threshold, wherein the first attitude solution, the second attitude solution, and the discriminator attitude solution are each the same one of pitch, roll or heading measurements.

2. The avionics system of claim 1, wherein the attitude heading and reference unit comprises:
   a primary processing device communicatively coupled to the primary inertial sensor assembly, wherein the primary processing device is configured to receive the primary inertial data and calculate the primary set of attitude solutions from the primary inertial data; and
   a secondary processing device communicatively coupled to the secondary inertial sensor assembly, wherein the secondary processing device is configured to receive the secondary inertial data and calculate the secondary set of attitude solutions.

3. The avionics system of claim 2, wherein the improved attitude heading and reference unit further comprises:
   a primary input-output unit communicatively coupled to the primary processing device, wherein the primary input-output unit is configured to receive the primary set of attitude and inertial solutions from the primary processing device and output the primary set of attitude and inertial solutions to the display device; and
   a secondary input-output unit communicatively coupled to the secondary processing device, wherein the secondary input-output unit is configured to receive the secondary set of attitude solutions from the secondary processing device and output the secondary set of attitude solutions to the display device.

4. The avionics system of claim 2, wherein the primary processing device is a microprocessor and the secondary processing device is a field programmable gate array.

5. The avionics system of claim 2, wherein the primary processing device executes a primary set of algorithms to calculate the primary set of attitude solutions and the secondary processing device executes a second set of algorithms to calculate the secondary set of attitude solutions, wherein the primary set of algorithms is different than the second set of algorithms.

6. The avionics system of claim 2, wherein the primary inertial assembly includes three primary gyroscopes and three primary accelerometers and wherein the secondary inertial sensor includes three secondary gyroscopes and three secondary accelerometers, wherein the three primary gyroscopes are different than the three secondary gyroscopes and wherein the three primary accelerometers are different than the three secondary accelerometers.

7. The avionics system of claim 1, wherein the first set of attitude solutions, the primary set of attitude solutions and the secondary set of attitude solutions is at least one of the following: pitch, roll or heading.

8. The avionics system of claim 1, wherein the attitude heading and reference unit is configured to receive signals from a global navigation satellite receiver.

9. The avionics system of claim 1, wherein the display device displays an alert when the difference between the first set of attitude solutions and the primary set of attitude solutions is above a threshold.

10. An attitude heading and reference unit comprising:
    a primary inertial sensor assembly and a secondary processing device both included within a single modular unit;

a primary inertial sensor assembly configured to produce primary inertial data;

the primary processing device communicatively coupled to the primary inertial sensor assembly, wherein the primary processing device is configured to receive the primary inertial data and calculate a primary set of attitude solutions from the primary inertial data using a primary set of algorithms;

a secondary inertial sensor assembly configured to produce secondary inertial data;

the secondary processing device communicatively coupled to the secondary inertial sensor assembly, wherein the secondary processing device is configured to receive the secondary inertial data and calculate a secondary set of attitude solutions using a second set of algorithms, wherein the primary set of algorithms is different than the second set of algorithms and the secondary processing device calculates a subset of attitude and inertial solutions that the primary processing device calculates; and wherein, in response to a determination that the difference between a first set of attitude solutions and the primary set of attitude solutions is greater than a threshold, a display device is configured to:

determine when a first attitude solution from the primary set of attitude solutions is different than a second attitude solution by a first threshold, wherein the second attitude solution is produced by an inertial reference unit other than the attitude heading and reference unit;

obtain an attitude solution from the secondary processing device to use as a discriminator attitude solution, wherein the first attitude solution, the second attitude solution, and the discriminator attitude solution are each the same one of pitch, roll or heading measurements;

wherein the display device is further configured such that:

if the difference between the first attitude solution and the second attitude solution is greater than the first threshold, then the display device will determine whether the primary set of attitude solutions is correct by determining whether the difference between the first attitude solution and discriminator attitude solution is less than a second threshold or whether the difference between the second attitude solution and the discriminator attitude solution is less than the second threshold.

11. The attitude heading and reference unit of claim 10, further comprising:

a primary input-output unit communicatively coupled to the primary processing device, wherein the primary input-output unit is configured to receive the primary set of attitude and inertial solutions from the primary processing device and output the primary set of attitude and inertial solutions to the display device; and a secondary input-output unit communicatively coupled to the secondary processing device, wherein the secondary input-output unit is configured to receive the secondary set of attitude solutions from the secondary processing device and output the secondary set of attitude solutions to the display device.

12. The attitude heading and reference unit of claim 10, wherein the primary processing device is a microprocessor and the secondary processing device is a field programmable gate array.

13. The attitude heading and reference unit of claim 10, wherein the primary processing device executes a primary set of algorithms to calculate the primary set of attitude solutions and the second processing device executes a second set of algorithms to calculate the secondary set of attitude solutions, wherein the primary set of algorithms is different than the second set of algorithms.

14. The attitude heading and reference unit of claim 10, wherein the first set of attitude solutions, the primary set of attitude solutions and the secondary set of attitude solutions is at least one of the following: pitch, roll or heading.

15. The attitude heading and reference unit of claim 10, wherein the attitude heading and reference unit is configured to receive signals from a global navigation satellite receiver.

16. The attitude heading and reference unit of claim 10, wherein the primary inertial assembly includes three primary gyroscopes and three primary accelerometers and wherein the secondary inertial sensor includes three secondary gyroscopes and three secondary accelerometers, wherein the three primary gyroscopes are different than the three secondary gyroscopes and wherein the three primary accelerometers are different than the three secondary accelerometers.

17. The attitude heading and reference unit of claim 10, wherein the display device displays an alert when the difference between the first set of attitude solutions and the primary set of attitude solutions is above a threshold.

18. A method for determining which of two dissimilar attitude solutions is correct comprising:

calculating a first set of attitude solutions using an inertial navigation device;

calculating a primary set of attitude solutions using an attitude heading and reference unit, wherein calculating the primary set of attitude solutions is done using a primary set of algorithms;

calculating a secondary set of attitude solutions using the attitude heading and reference unit, wherein calculating the secondary set of attitude solutions is done using a second set of algorithms, wherein the primary set of attitude solutions is calculated by a primary processing device and the a secondary set of attitude solutions is calculated by a secondary processing device, wherein the primary set of algorithms is different than the second set of algorithms, wherein the primary inertial sensor assembly and the secondary processing device are both included within a single modular unit, wherein the secondary processing device calculates a subset of attitude and inertial solutions that the primary processing device calculates, and wherein the inertial navigation device is a separate device from the attitude heading and reference unit; and determining whether the first set of attitude solutions or the primary attitude solution is correct by determining whether the difference between a first attitude solution from the first set of attitude solutions and a discriminator attitude solution from the secondary set of attitude solutions is less than a threshold or whether the difference between the primary set of attitude solutions and the discriminator attitude solutions is less than a threshold, in response to a determination that the difference between the first set of attitude solutions and the primary attitude solutions is greater than a threshold;

wherein the first attitude solution, the second attitude solution, and the discriminator attitude solution are each the same one of pitch, roll or heading measurements.

19. The method of claim 18, further comprising generating an alert signal when the difference between the first set of attitude solutions and the primary set of attitude solutions is above a threshold.

20. The method of claim 18, wherein the first set of attitude solutions, the primary set of attitude solutions and the secondary set of attitude solutions is at least one of the following: pitch, roll or heading.

* * * * *